United States Patent
Mahkonen

(10) Patent No.: US 8,537,951 B2
(45) Date of Patent: Sep. 17, 2013

(54) DETECTION OF JITTER IN A COMMUNICATION NETWORK

(75) Inventor: Arto Mahkonen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/379,163

(22) PCT Filed: Jun. 26, 2009

(86) PCT No.: PCT/EP2009/058065
§ 371 (c)(1), (2), (4) Date: Dec. 19, 2011

(87) PCT Pub. No.: WO2010/149226
PCT Pub. Date: Dec. 29, 2010

(65) Prior Publication Data
US 2012/0099689 A1    Apr. 26, 2012

(51) Int. Cl.
*H04L 7/00* (2006.01)

(52) U.S. Cl.
USPC ........... 375/371; 375/355; 375/357; 375/368; 370/516; 370/509; 370/514; 370/512

(58) Field of Classification Search
USPC ................ 375/371, 355, 357, 368; 370/516, 370/509, 514, 512
See application file for complete search history.

(56) References Cited

U.S. PATENT DOCUMENTS

| | | | |
|---|---|---|---|
| 4,086,437 A * | 4/1978 | Henrion et al. | 370/517 |
| 5,414,739 A | 5/1995 | Kobayashi et al. | |
| 6,597,214 B1 * | 7/2003 | Singh et al. | 327/141 |
| 2006/0062208 A1 | 3/2006 | Li et al. | |
| 2006/0077981 A1 | 4/2006 | Rogers | |
| 2008/0058017 A1 | 3/2008 | Carter et al. | |

FOREIGN PATENT DOCUMENTS

| | | |
|---|---|---|
| GB | 2441372 A | 3/2008 |
| JP | H05136775 A | 6/1993 |
| JP | 2002281077 A | 9/2002 |
| JP | 2005333533 A | 12/2005 |
| JP | 2010518669 A | 5/2010 |

* cited by examiner

Primary Examiner — Daniel Washburn
Assistant Examiner — Rahel Guarino
(74) Attorney, Agent, or Firm — Coats & Bennett, P.L.L.C.

(57) ABSTRACT

A network entity and computer program for detecting occurrence of transmission resynchronizations in a network carrying packets subject to variable delays, and adaptively varying the play out time of data packets. The method may include that the packets are received at a network entity and forwarded by delaying them by a jitter protection time, and determining for a predetermined time period a set of arrival time jitter values. A peak to peak value may be determined indicating the largest difference among the values included in the determined set of arrival time jitter values and detecting an out of range condition. The peak to peak value may be compared with the jitter protection time when the out of range condition is detected and detecting that a resynchronization occurred on the basis of the comparing.

17 Claims, 9 Drawing Sheets

DETECTION OF JITTER IN A COMMUNICATION NETWORK

TECHNICAL FIELD

The present invention relates to communication in a network wherein transmitted data packets are subject to variable delays. More particularly, the invention is concerned with a method for detecting occurrence of a transmission resynchronization of data packets subject to variable delays, to a network entity for detecting occurrence of a transmission resynchronization of data packets subject to variable delays in a communication network and to a computer program product for detecting occurrence of a transmission resynchronization. Furthermore, the invention is also concerned with a method for adaptively varying the play-out time of data packets subject to variable delays during transmission in a communication network.

BACKGROUND

When a data packet stream with regular packet intervals ($T_{repInterval}$)—like for instance in a conversational telephony service—enters to a network node—like for instance some media gateway—from such an interface, where transport delay varies, a jitter buffer is required in the node in order to guarantee a continuous and constant rate play-out with regular intervals from the network node towards another interface, which may require very small variation in the output timing (like circuit switched telephony networks, or a constant rate play-out on a user equipment).

The motivation and principles of jitter buffering in a network node are illustrated in FIG. 4, depicting the principles of jitter. Only the essential parts are shown in the figure, and all other necessary processing functions—like for instance speech decoder in a conversational telephony service—are omitted. The figure is only a one-way view omitting the other direction, even if the connection may be full-duplex like for instance in a conversational telephony service.

A source node 10 generates a packet stream with a constant interval represented by $T_{repInterval}$. This packet stream is transported through a network like a packet switched network 30. The packet switched network 30 may cause delays which are not constant resulting in jitter. The packet stream transported over network 30 is received at the network node 20, which needs now to remove the jitter. An example of the network node 20 may be a media gateway. The network node 20 comprises a jitter buffer 22 for storing the packets of the packet stream received from the network 30. The network node also plays out the packets from the jitter buffer 22 with a constant interval. Playing out means that the packets are output or forwarded to another network like a transport network 40. The transport network 40 may be a network that does not tolerate jitter like for instance a circuit switched network.

Reference number 24 schematically indicates the part of the network node 20 which play out packets from the jitter buffer with a known or constant interval and outputs them to the network 40.

The idea of jitter buffer is to compensate for the variation of the transport delay over the first (e.g. packet switched) network and keep the total delay ($d_{total}$) between the play-out time from the jitter buffering node and the transmission time from the packet source as constant as possible.

This is illustrated by an example in FIG. 5. The individual transport delays ($d_i$) are random variables with a certain distribution in the range between the smallest ($d_{min}$) and largest ($d_{max}$) delay. The probability density function (pdf) is usually not a symmetric Gaussian pdf, but an asymmetric distribution (for instance like Poisson's distribution by the shape) is quite typical. The peak-to-peak jitter ($J_{peaktopeak}$) is ~6.5 ms in the example of FIG. 2 and stands for the difference $d_{max}-d_{min}$. It is not normally known in advance, but must be based on measurements and/or reasonable estimates related e.g. to the interface (or use case). Exact values for $d_{min}$ and $d_{max}$ are neither known definitely, but they are specified indirectly by certain probabilities—like for instance $P\{d_i<d_{min}\}<\epsilon_1$ and $P\{d_i<d_{max}\}<1-\epsilon_2$, where $\epsilon_1$ and $\epsilon_2$ are some small values e.g. in the range $10^{-5}, \ldots, 10^{-3}$.

The jitter protection time ($T_{jit}$) is typically added to the arrival time ($T_{in,0}$) of the first packet to get the play-out time ($T_{out,0}$) for the first packet. After that the play-out time for the subsequent packet i is given by a recursion $T_{out,i}=T_{out,i-1}+T_{repInterval}$. This is illustrated in FIG. 5 by the horizontal line corresponding to the play-out delay. The individual buffering delay of a packet i is defined by $d_{buf,i}=T_{out,i}-T_{in,i}=d_{total}-d_i$, which is a complementary random variable with respect to the (unknown) transport delay $d_i$ (i.e. the bigger $d_i$ is, the smaller $d_{buf,i}$ is and vice versa).

The value of $T_{jit}$ is set so that it protects against late losses, which mean that the jitter buffer is empty, when the next play-out time $T_{out,i}$ expires. However in order to keep the jitter buffering margin and consequently the total delay as small as possible $T_{jit}$ must be set as small as possible. This is a trade-off between late loss probability and delay. In the static jitter buffering example of FIG. 5 $T_{jit}$ has been set to 7 ms so that there is a margin of ~0.5 ms on top of the so far experienced peak-to-peak jitter ($J_{peaktopeak}$) of 6.5 ms.

The determination of the play-out time sequence $T_{out,i}$ is also called by the word synchronization. Note that because the first arrival time $T_{in,0}$ is also a random variable corresponding to one sample of the random transport delay $d_0$, it is actually a constant $T_{in,k,0}$ per a stream instance k, but it is randomly distributed over the set of instances k in a similar way as the individual transport delays $d_i$ are distributed over the set of delays. It is noted that in this discussion it is assumed that the distribution of the delays is time invariant. So actually the total delay $d_{total,k}$ is a random variable over instances k in the range $d_{min}+T_{jit}, \ldots, d_{max}+T_{jit}$ with the same distribution as $d_i$, but time invariant i.e. jitter free per instance k. In the example of the FIG. 5 $T_{in,0}$ corresponds to a transport delay $d_0=21$ ms, which is close to observed $d_{min}$ in this example.

One problem that may occur in the prior art consists in that the packet source 10 of FIG. 4 may change the phase of the delivery sequence by a certain time step after the jitter buffering in the receiving node has been synchronized. In other words, the synchronization source may change. When this happens, the optimal play-out time sequence with respect to the new arrival time sequence is usually not aligned with the original play-out time sequence. This typically causes a misalignment delay that may in the worst case result in a sudden increase of late losses, since some or many packets are received with an excessive delay. This is illustrated for instance in FIG. 6. It should be noted that late losses may be caused also by other factors different from resynchronization or from a time step change at the packet source 10. For instance, late losses may be caused by real jitter caused by noise or delays in the network that result in an accidental and sometimes sporadic late loss. Such a situation is depicted for instance in FIG. 14, showing a case where a delay peak due to high jitter caused an overshoot of the delay with which the packet is received at the network node. Such late received packet may also result in late loss. Prior art techniques are based on the detection of overshoots in order to monitor the occurrence of late losses. However, a problem arises in the prior art consisting in how to reliably detect the presence of resynchronization, i.e. how to reliably detect that a certain time step change has occurred at a node in a network resulting in a different phase with which packets are received at the network node 20 and from there forwarded. Moreover, a problem exist in that the prior art technique based on the detection of overshoots is not capable of distinguishing between overshoots caused by delay peaks caused by high jitter, for instance due to noise or accidental delays in the network, and overshoots caused instead by a resynchronization. Thus, the prior art suffers from the problem of not being able to reliably detect the presence of resynchronization when this occurs in the network.

Moreover, the prior art also suffers from the fact that the play-out time selected for forwarding the packets from the network node 20 to the network 40 leads to excessive and non optimal delays. In fact, when late losses occur and when those are correctly detected, regardless of whether they are caused by sporadic delay peaks due to high jitter or by resynchronization, prior art techniques are based on increasing the play-out time in order to ensure that no more late losses occur. According to the prior art, the increase of the play-out time is made in a static way by increasing the play out time up to a maximum allowed delay. Such a measure is typically implemented with the aim of reducing further late losses. However, such solutions lead to an excessive delay which is often unnecessary in view of the total distribution of delays. Thus, the prior art suffers also from the problem that the play out time leads to excessive delays when protection against late losses is desired. In other words, the prior art suffers also from the problem that the play out time is not optimized according to the network conditions that may cause resynchronizations or sporadic and accidental high jitters.

SUMMARY OF THE INVENTION

An object of the invention is to obviate at least some of the above disadvantages and provide an improved technique for dealing with data packets subject to variable delays in a communication network and for detecting when resynchronizations occur in the network. A further object of the invention is to provide an optimal choice of the play out time according to network conditions.

According to a first embodiment of the present invention, a method is provided for detecting occurrence of a transmission resynchronization of data packets subject to variable delays in a communication network.

According to an embodiment of the present invention, it is provided a method for detecting occurrence of a transmission resynchronization of data packets subject to variable delays in a communications network, the packets received at a network entity and forwarded by the network entity by delaying them of a jitter protection time.

The method according to this embodiment comprises performing at the network entity a steps of determining for a predetermined time period a set of arrival time jitter values comprising values corresponding to jitters of data packet arrival time for at least a plurality of the received data packets. The method further includes a step of determining a peak to peak value indicating the largest difference among the values comprised in the determined set of arrival time jitter values and a step of detecting an out of range condition when it is verified that at least one arrival time jitter value is larger than an upper threshold or at least one arrival time jitter value is smaller than a lower threshold. The method according to this embodiment then comprises performing the step of comparing the peak to peak value with the jitter protection time, when the out of range condition is detected and the step of detecting that a resynchronization occurred on the basis of the comparing.

The method according to this embodiment makes it possible to more accurately detect resynchronizations by avoiding for instance misdetections that may be instead triggered by the occurrence of sporadic and accidental delay peaks due to high jitter caused for instance by noise or occasional situations present in the network. The resulting method therefore allows a more accurate detection of resynchronization of data packets during transmission in a communication networks.

According to a second embodiment of the present invention, a network entity is provided for detecting occurrence of a transmission resynchronization of data packets subject to variable delays in a communication network.

The network entity according to the second embodiment comprises a transmitter, a processor, a detector and a comparator. The transmitter is adapted to forward received data packets after having delayed said received packets of a jitter protection time. The processor is adapted to determine for a predetermined time period a set of arrival time jitter values comprising values corresponding to jitters of data packet arrival time for at least a plurality of the received data packets. The processor is further adapted to determine a peak to peak value indicating the largest difference among the values comprised in the determined set of arrival time jitter values. The detector is configured to detect an out of range condition when it is verified that at least one arrival time jitter value is larger than a predetermined upper threshold or at least one arrival time jitter value is smaller than a predetermined lower threshold. Then, the comparator is adapted to perform a comparison between the peak to peak value and the jitter protection time, when the out of range condition is detected. Moreover, the processor is further adapted to detect that a resynchronization occurred on the basis of the comparison.

The network entity according to the second embodiment is also capable of providing a more accurate detection or resynchronizations. It is further capable of avoiding misdetections caused for instance by the occurrence of sporadic and accidental high peaks due to high jitter.

Furthermore, according to a third embodiment of the present invention, a computer program product is provided which comprises program parts arranged for conducting the method according to a first embodiment of the present invention or variations thereof as explained in the present description.

The computer program according to the third embodiment achieves also the advantages of allowing a more accurate detections of resynchronizations in a network and avoiding misdetections caused for instance by the occurrence of sporadic and accidental delay peaks due to high jitter.

According to a fourth embodiment of the present invention, a method is provided for adaptively varying the play-out time of data packets subject to variable delays during transmission in a communication network, wherein the data packets are received at a network entity and forwarded by the network entity at a current play out time. The play out time is obtained by delaying said data packets of a given jitter protection time. The method according to the fourth embodiment comprises performing at said network entity the steps of determining during a given time period a nominal time of arrival corresponding to the smallest expected time of arrival of packets received during said given time period. The method of the fourth embodiment further comprises performing at the network entity the step of determining whether a resynchronization occurred during transmission of said data packets and, if it is determined that a resynchronization occurred, the step of determining a new play out time at least on the basis of the current jitter protection time and the nominal time of arrival.

According to a modification of the method of the fourth embodiment, the step of determining the new play out time may comprise adding the given jitter protection time to the determined nominal time of arrival, when it is determined that the resynchronization occurred as consequence of increased delay in the transmission.

According to a modification of the method of the fourth embodiment, the step of determining the new play out time may comprise subtracting to the current play out time the difference between a nominal time of arrival calculated in a preceding time period and the determined nominal time.

According to a modification of the method of the fourth embodiment, the method may further comprise forwarding at the network entity the packets by delaying them by the new play out time.

The fourth embodiment allows a more flexible and adaptive way of modifying the play out time according to the type and entity of resynchronization. Thus, the delay in forwarding packets can be kept at a minimum in a flexible and adaptive manner according to the circumstances and network conditions.

The solution provided by the present invention allows an accurate detection of transmission resynchronization. In fact, thanks to the present invention, it is possible to detect with high accuracy whether a transmission resynchronization occurred which is distinguished from the occurrence of accidental and occasional losses caused by delay peaks due to sporadic high jitter.

The present invention further provides the possibility of adapting the play-out time in more efficient way when compared to the prior art since, when resynchronization has been detected, the play-out time can be selected in an effective way by minimizing the overall delay.

The present invention obviates at least some of the disadvantages of the prior art, as for instance above explained, and provides improved methods, devices and computer programs as above explained.

DETAILED DESCRIPTION

In the following, preferred embodiments of the invention will be described with reference to the figures. It is noted that the following description contains examples that serve to better understand the claimed concepts, but should not be construed as limiting the claimed invention.

Figure 1:
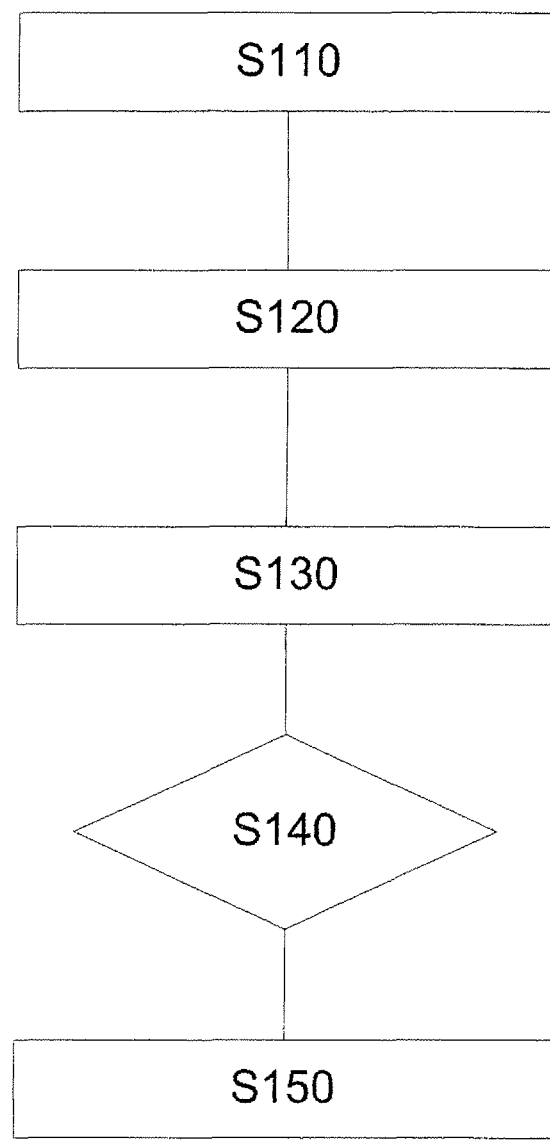
FIG. 1 illustrates a schematic flow chart showing the steps according to a method embodying the present invention.

The schematic flow chart of FIG. 1 shows the steps executed by a method according to an embodiment of the present invention for detecting occurrence of a transmission resynchronization of data packets subject to variable delays in a communication network. With the term synchronization it is referred to the determination of the play-out sequence of packets transmitted over a network. For instance, when making reference to the exemplary network depicted in FIG. 4, the sequence would be the sequence with which a network entity like the network node 20 forwards data packets received from another network entity, wherein the data packets within the sequence are separated by predetermined intervals. In particular embodiments as explained in the following the packets are separated by regular intervals, however the invention is not limited thereto. In fact, the invention can also be applied to the case where packets are separated by variable but known intervals. Synchronization is particularly relevant and important when packets need to be forwarded according to a predetermined sequence or succession like in the case of voice packets. Resynchronization means that the network entity may need to reorganize the sequence of received packets before forwarding them. Reorganizing the sequence or re-synchronizing implies that the packets are still transmitted at regular intervals but with a different phase or with a different delay.

The data packets to which the present invention can be applied are packets received at a network entity and forwarded by the network entity by delaying those packets of a jitter protection time. Forwarding in this context may also embed processing of the packets like for instance speech transcoding. The jitter protection time is a predetermined time which is added to a reference packet and then to all subsequent packets at least for a predetermined period. The reference packet may be in one example the first received packet. The jitter protection time does not need to be assigned necessarily to the first received packet but can be added to a packet satisfying a given condition or to a packet selected as the first received packet according to a predetermined condition amongst other received packets. For instance, an initial arrival time may be determined with the help of several consecutive arrival times wherein the arrival time corresponding to the smallest delay is selected as representing the initial arrival time. According to one further embodiment making reference to the total delay $d_{total}$ and to the range as discussed above (see e.g. $d_{min}+T_{jit}, \ldots, d_{max}+T_{jit}$) it is noted that in order to increase the probability of the lower end of the above range for the total delay $d_{total}$ the initial arrival time $T_{in,0}$ could be determined with the help of several (e.g. 10) consecutive arrival times at the beginning and selecting the one corresponding to the smallest $d_i$ as the representative initial arrival time for the synchronization. This is possible, if it is allowed to waste (e.g.) the first 10 packets or play them out with a longer total delay $d_{total}$ than the rest of the packets. However, we also note that this implementation is optional, since the present invention may avoid this, because it will eventually request resynchronization, if $d_0$ is far from $d_{min}$.

The jitter protection time is added to the initial arrival time or to the selected value representing the initial time in order to obtain synchronization. In other words, the jitter protection time is a guard time or a margin added to the received sequence of packets in order to guarantee that packets received at a network entity at irregular spacing intervals are forwarded with more regular spacing intervals or at exactly given regular spacing intervals. A network entity is a component of the communication network adapted for handling traffic. In one example the network entity is a network node or device. In another example, the network entity may be distributed over several network nodes or network devices or may be comprised within a network node or network device. The network entity may be implemented in hardware, software or any suitable combinations thereof. In one example, the network entity is a media gateway. The traffic comprises all type of information that can be communicated over the communication network like for example data packets including data, voice, video or signaling messages or overhead information associated to the transmitted information.

The method according to the present embodiment comprises steps performed at a network entity as illustrated in FIG. 1. At step S110 the method determines for a predetermined time period a set of arrival time jitter values comprising values corresponding to jitters of data packet arrival time for at least a plurality of the received data packets. The predetermined time period is a time window having in one example a predetermined length or duration in time. For instance the predetermined time period may be a detection period having duration of two seconds or any other value comprising a certain number of received packets. The predetermined time period during which determination is performed does not need to be linked to a fixed duration but may also be determined on the basis of a condition to be satisfied. In fact, the predetermined time period may be defined in other circumstances as a detection period aligned with a talk spurt in telephony services. For instance, when DTX transmission is enabled the predetermined time period can be a period within a talk spurt during the DTX transmission. In other words, the predetermined time period may be a sufficiently long talk spurt within the DTX transmission, wherein sufficiently long means that a given number of packets are received during said predetermined time period so that an analysis—as for instance explained in the following—may be based on reliable amount of consecutive packets. Of course, a combination of both ways could be used, for instance the predetermined time period being a detection period selected as a talk spurt or a constant timeout value whichever expires first.

The jitter refers to the variation of a significant value related to a signal or to a packet. In the present case the jitter of data packet arrival time refers to an indication of the variation of the actual arrival time compared to a theoretical expected arrival time. In other words, the jitter of data packet arrival time represents an indication of the variation of the arrival time of a data packet, wherein this arrival time represents a significant value for the data packet. With this respect, the mentioned variation may be the variation between an absolute arrival time and an absolute expected time, wherein the absolute values refers to a system wherein it is possible to refer the absolute current arrival time and the absolute expected time to the same time reference. This could be achieved in systems wherein the synchronization between receivers and transmitter clocks is possible or wherein adequate signaling is in place to ensure that such values are available or wherein other measures like suitable time stamps are used. However, the jitter may be also represented by the variation between an expected time of arrival of a packet at the network entity and the actual time of arrival. This could be advantageous in those cases wherein the network entity does not have a reference to a synchronized clock with the other network devices. Moreover, the jitter may be also represented by the actual arrival time of a packet assuming that this is implicitly referred to an actual arrival time. In one embodiment detailed in the following, the actual arrival time of a packet is assumed to represent the arrival time jitter value. In other words, given the definition of jitter, different implementations may be made as explained and as also detailed in the following further embodiments. It is noted that the set of arrival time jitter values may comprise the arrival time jitter values corresponding to all the packets received within the predetermined time period or only a part of those received packets. The packets received or needed for the determination of the set of arrival time jitter values may be optionally stored and then processed once the predetermined time period has lapsed or processed in real time upon reception, so that memory can be saved.

The method according to the present embodiment then foresees the step S120 of determining a peak to peak value indicating the largest difference among the values comprised in the determined set of arrival time jitter values. In other words, the peak to peak value may be calculated as the largest difference among the values comprised in the set of arrival time jitter values determined in step S110. It is noted that in some embodiments the peak to peak value may be calculated as the largest difference among the absolute values comprised in the determined set of arrival time jitter values. In other embodiments, the peak to peak value may be calculated as the largest amongst the absolute values of the differences among the values comprised in the determined set of arrival time jitter values.

The method according to the present embodiment then foresees step S130 comprising detecting an out of range condition when it is verified that at least one arrival time jitter value is larger than an upper threshold or at least one arrival time jitter value is smaller than a lower threshold. The "or" in the detecting step S130 implies, in one embodiment, that an out of range condition is determined when one or both conditions are verified, namely that least one arrival time jitter value is larger than an upper threshold and/or at least one arrival time jitter value is smaller than a lower threshold. In another embodiment, the "or" of step S130 is an exclusive or implying that an out of range condition is verified only when at least one arrival time jitter value is larger than an upper threshold or alternatively only when at least one arrival time jitter value is smaller than a lower threshold. The upper and lower thresholds are predetermined values and may be adaptively changed according to circumstances. In one embodiment the upper threshold corresponds to a play-out delay time, i.e. the time at which a data packet is scheduled to be forwarded or transmitted by the network entity and may correspond to the time of arrival of the first packet or of a packet selected as the first packet added by the jitter protection time. The lower threshold in one embodiment may correspond to an expected minimum time of arrival which can be determined in different ways as also explained in the following. Consequently, the out of range condition indicates that the delay of a packet received at a network entity exceeds a maximum expected delay or is below a minimum expected delay. When the jitter value is represented by the actual time of arrival of a data packet, the out of range condition indicates that the actual time of arrival is later than the maximum allowed time of arrival corresponding for instance to the play-out delay or is earlier than the minimum expected time of arrival.

The method according to the present embodiment then foresees the step S140 of comparing the peak to peak value with the jitter protection time when the out of range condition is detected. In other words, when a result of the detecting step S130 is that an out of range condition is detected, the peak to peak value determined at step S120 is compared with the jitter protection time.

Figure 6:
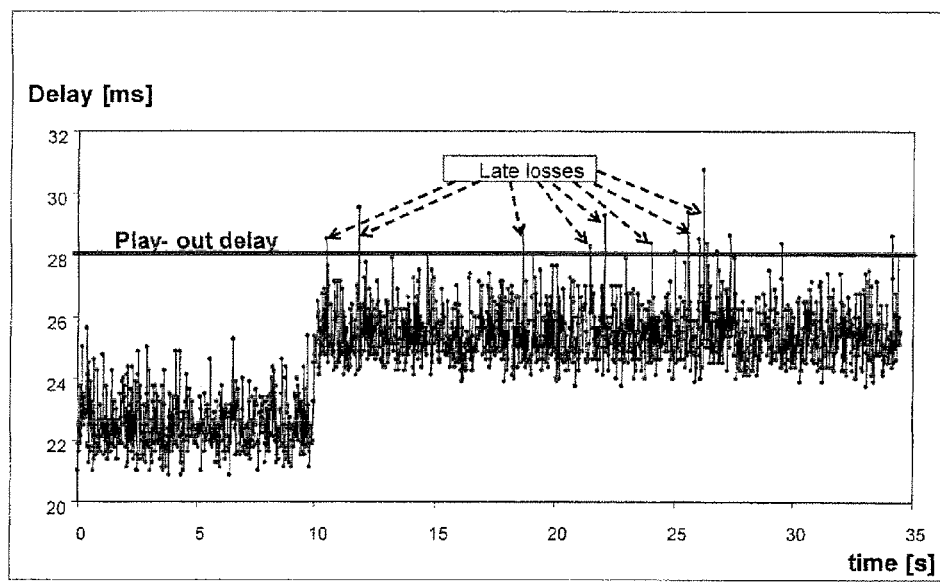
FIG. 6 represents an example illustrating an example of a misalignment delay step of 3.5 ms causing late losses with static jitter buffer delay.
Figure 14:
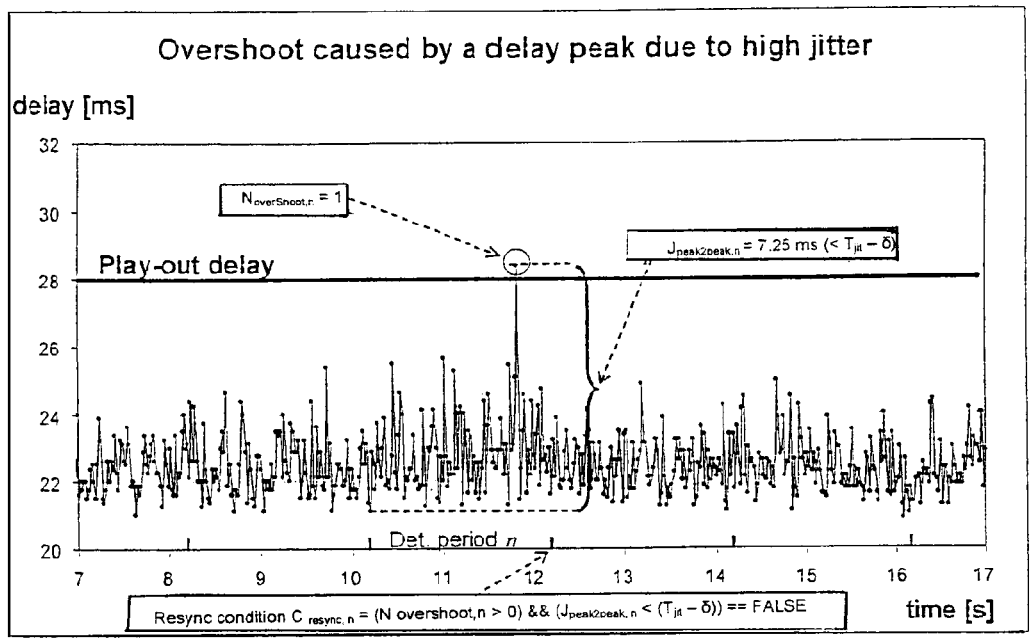
FIG. 14 shows an example of an overshoot caused by a delay peak due to high jitter.

The method according to the present embodiment then foresees the step S150 of detecting that a resynchronization occurred on the basis of the comparing performed at step S140. For instance, in case an out of range condition is detected in conjunction with step S140 indicating that the peak to peak value is smaller than the jitter protection time, then step S150 detects that a resynchronization occurred. According to another example, in case instead an out of range condition is detected but step S140 indicates that the peak to peak value is larger than the jitter protection time, step S150 indicates that no resynchronization occurred. The method according to the present embodiment is in fact based on the recognition and insight that when resynchronization occurs typically a shift of the average phase (with which packets are forwarded) occurred while the difference between the minimum and maximum delay experienced over a given period of time does typically not change before and after resynchronization. The invention is also based on this recognition, namely that in presence of resynchronization the peak to peak value typically maintains the same proportion relative to the jitter protection time. Consequently, when the peak to peak value is in a given proportion to the jitter protection time, the method may detect that a resynchronization occurred. According to an example, such condition may be detected when the peak to peak value is smaller than the jitter protection time. According to another example, the same condition may be detected when the peak to peak value is smaller than the jitter protection time minus a predetermined given value representing for instance a given margin. The given margin may be conveniently chosen in order to take into account inaccuracies and in order to avoid for instance hysteresis. On the contrary, when the out of range condition is detected there could be a situation wherein the relationship between the maximum and minimum delays or arrival times within a predetermined time period are in a particular relationship with respect to the jitter protection time. The present method is based also on this recognition that when for instance the peak to peak value is larger than the jitter protection time or, according to another embodiment, larger than a jitter protection time plus a value indicative of a given margin, no resynchronization occurred. In such a case, the out of range condition may have been detected as a consequence of occasional or sporadic delay peak due to high jitter (caused within the network) without being linked to a resynchronization of the transmitted packets. A typical situation wherein resynchronization occurred is represented in FIG. 6, wherein the resynchronization results in an increase of the average delay (upward delay step) of data packets causing some delays to exceed the play-out delay. The delays exceeding the play-out delay, i.e. the overshoots, result in late losses as indicated in FIG. 6. FIG. 14 instead depicts a case of a late loss corresponding to an out of range condition caused by a sporadic delay peak. Late losses as depicted in FIG. 14 are not linked to a resynchronization of the transmitted packets.

The method according to the present embodiment therefore allows to detect whether a resynchronization occurred in a more accurate way since it avoids for instance misdetections caused by the occurrence of delay peaks due to high jitter not caused by resynchronization. The advantage is achieved since the invention does not only rely on the detection of an out of range condition but also on the result of a comparison between the peak to peak value with the jitter protection time when an out of range condition is detected. The peak to peak value is determined among the value comprised in a set of arrival time jitter values determined for a predetermined time period. By properly adjusting or selecting the predetermined time period the accuracy, reliability and timeliness of the method can be adjusted. Thus, the possibility of adjusting the time period allows tuning the accuracy and reliability of the detection.

The method according to the present embodiment therefore achieves a high accurate detection of resynchronization in the transmission of data packets subject to variable delays and avoids misdetections which would otherwise occur when basing a decision only on an out of range condition.

According to a further embodiment of the present invention, the method depicted in FIG. 1 may further comprise a step of changing the jitter protection time depending on the step S150 of detecting. In other words, when it is determined in step S150 that a resynchronization occurred, the method may further foresee changing the jitter protection time in order to take into account the resynchronization. The step of changing the jitter protection time is optional. In fact, in one embodiment, when a resynchronization is detected the jitter protection time may be left unchanged while an alarm may be issued in one example. Furthermore, when an out of range condition is detected but it is at the same time for instance detected that the peak to peak value is larger than the jitter protection time, no action needs to be taken according to another example. On the other side, when it is detected that a resynchronization occurred, several types of changes of the jitter protection time may be taken depending on the type of resynchronization. For instance, when it is determined that a resynchronization occurred in conjunction with an overshoot, e.g. according to an embodiment later described in conjunction with the verification that at least one arrival time jitter value is larger than an upper threshold, the jitter protection time may be changed such that it is increased as a consequence. Similarly, when a resynchronization has been detected in conjunction with an undershoot, e.g. in conjunction with the verification that at least one arrival time jitter value is smaller than a lower threshold according to an embodiment later described, the jitter protection time can be changed such that it is decreased.

Figure 7:
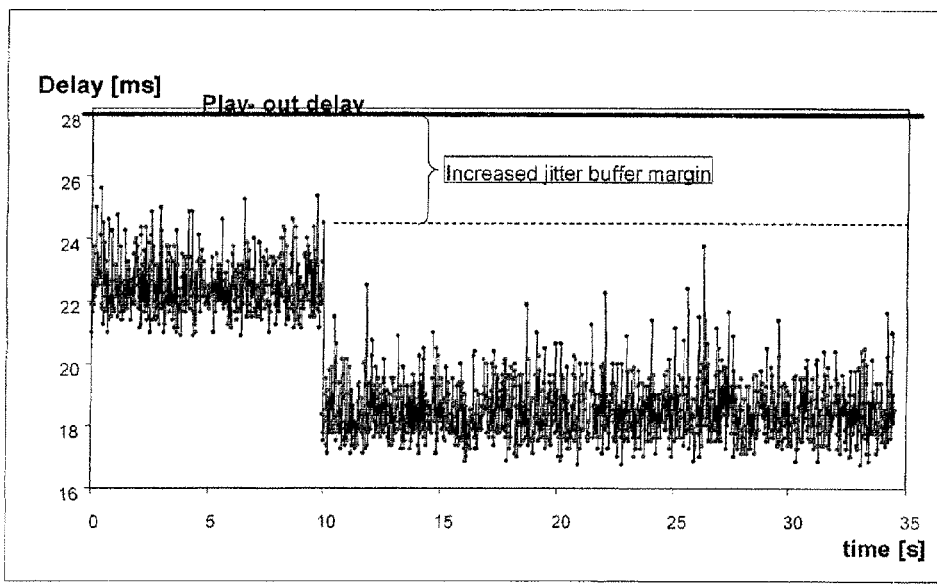
FIG. 7 shows an example illustrating a misalignment delay step of 16.5 ms looking like a downward delay step of 3.5 ms delay.
Figure 8:
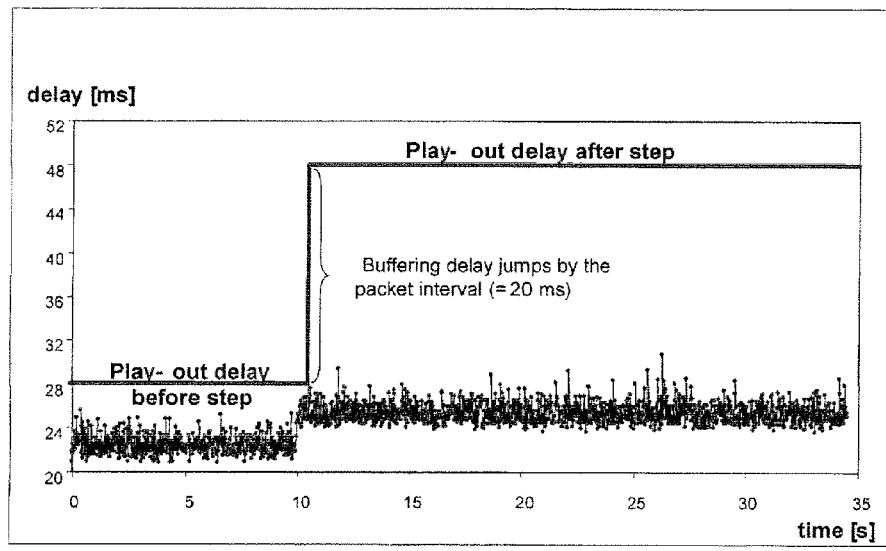
FIG. 8 illustrates an example implying a semi-static jitter buffer 3.7 ms input delay step that makes buffering delay to jump.

According to a further embodiment, the above step of changing the jitter protection time may further comprise changing the jitter protection time of an amount corresponding to the average of the arrival time jitter values. For instance, by making reference to the situation depicted in FIG. 6, an average can be calculated or estimated of the arrival time jitter values within the predetermined time period during which the set of arrival time jitter values is determined according to step S110. Thereafter, the jitter protection time may be increased, when an out of range condition is detected in conjunction with an overshoot, of an amount corresponding to the calculated or estimated average of the arrival time jitter values. According to another example, the jitter protection time may be decreased of an amount corresponding to the average calculated of the arrival time jitter values when an out of range condition is detected in conjunction with an undershoot. Such condition is depicted in FIG. 7. It shall be noted that the average variation, like for instance the standard deviation, is smaller than the peak to peak jitter like for instance in the range of 99.9% quantile. It is noted that the target of one embodiment may be set as tolerating the extreme values due to overshoot or undershoot in the jitter buffer rather than the average values.

The above mentioned further embodiments foresee a step of changing the jitter protection time depending on whether a resynchronization was detected. However, detecting a resynchronization may result also in different actions according to another embodiment of the present invention. According to this further embodiment, the operation optionally following the detection of a resynchronization may be summarized as in the following. The packets received at the network entity are forwarded by the same network entity by delaying the same packets of a jitter protection time. According to this further embodiment, the network entity may determine the time instant at which to forward the packets by adding the jitter protection time to a reference time. In this way, the delay of the packets by the jitter protection time is achieved. The reference time can be the time of arrival of a first received packet or the time of arrival of a reference packet selected among a set of received packets. In the previous embodiment the jitter protection time is varied upon detection of a resynchronization. According to the present embodiment, upon detection of a resynchronization, the jitter protection time is maintained unchanged while it is changed the reference time, which is the time on the basis of which the forwarding of the packets is performed. Therefore, for instance in presence of resynchronization in conjunction with an overshoot, the method may further comprise the change of the reference time by increasing the reference time. The jitter protection time is then added to the changed or increased reference time to obtain the time at which packets are forwarded to another network entity. In other words, the reference time is changed instead of the jitter protection time in order to obtain the play-out time with which packets are forwarded from the network entity. When a resynchronization is detected in conjunction with an undershoot, the method according to another embodiment may foresee changing the reference time by reducing the reference time. The play-out time with which packets are forwarded by the network entity is then calculated by adding the jitter protection time to the decreased reference time. The reference time can be, in one further embodiment, represented by the minimum expected time of arrival of a packet. In other words, according to this modifications of the method embodying the invention, instead of changing the jitter protection time, the reference time can be changed in order to obtain the play-out time with which packets are forwarded by the network entity. The reference time may correspond in one embodiment to the minimum expected time of arrival of packets.

Thus, according to the above considerations, a further embodiment is based on the above method or thereof variations further comprising the step of forwarding packets, at the network entity, by adding the jitter protection time to a reference time and the step of changing the reference time depending on the detecting that a resynchronization occurred. The reference time is a time instant representing a time basis from which it is determined the time instant at which packets are forwarded by the network entity. As illustrated above, the reference time may be taken as the time of arrival at the network entity of a first packet comprised in the predetermined period during which the determining step S110 is performed. According to another embodiment, the reference time may be chosen as the arrival time of a packet among a given number of packets received at the network entity at the beginning of the predetermined time period. For successive packets received at the network entity, the reference time can be updated by taking into account the known time interval separating packets as also outlined in a later described embodiment. Other reference time can be chosen as long as they allow determining a point in time at which to forward the following data packets. The reference time is then changed according to the detection of the resynchronization as explained above. As seen above, in response to the detection of a resynchronization, either the jitter protection time or the reference time or both can be changed indifferently as long as they allow a change of the play out time in response to the detection of a resynchronization.

According to a further embodiment of the present invention, in the methods and their variations above described the arrival time jitter values may comprise the actual times of arrival of received data packets at the network entity. In fact, as also above indicated and as also described in more detail in the following, the actual time of arrival may be regarded as an indication of the jitter. In fact, in such a case the time of arrival may be implicitly referred to the theoretical or expected reception time of the data packet or may be referred to the play-out time which represents the time instant with which data packet will be forwarded by the network entity. This implicit reference makes it possible to indicate the jitter by referring to the actual time of arrival of a data packet at the network entity. In such an embodiment, the network entity may optionally comprise means for maintaining an internal time reference with which to calculate the time of arrival of packets received by the network entity. When data packets are received at regular time intervals, as for instance in the case of voice data packets, the expected smallest reception time and the play-out time for subsequent packets are incremented as each packet is received by a time interval corresponding to the time period separating the data packets.

According to a further embodiment, the method or its further embodiments as described above may optionally further comprise a step of determining a nominal time of arrival for a received packet indicating the current smallest expected time of arrival for the received packet. In other words, the nominal time of arrival of a packet is a value which represents the smallest expected time of arrival for received packets. For the first received packet of a given sequence or within a given time window, the nominal time will be in one example the time of arrival of the first packet or, according to another example, the time of arrival of a packet selected among a given number of the packets received at the beginning of a certain time period. Assuming that the packets are received at regular and known time intervals, as is for instance the case of voice data packets, the nominal time of arrival for data packets received after the first data packet can be calculated as the nominal time of arrival for the previous data packet plus the predetermined and known time interval. Other ways may however be foreseen for determining a nominal time of arrival as long as they provide an indication which represents the earliest time at which the next data packet is expected to be received. Later in the description a further embodiment will be presented showing how this value can be calculated and updated at a network entity receiving data, packets spaced by regular time intervals.

According to a further embodiment, the step of determining the peak to peak value of the method according to any of the embodiments above described comprises determining the difference between the actual time of arrival of a given packet and the nominal time of arrival for this packet. In other words, in the case wherein a network entity receives data packets separated by known time intervals, the peak to peak value may be determined as the difference between the time instant at which a packet is actually received and the nominal time of arrival for the same packet, wherein the nominal time of arrival represents the earliest time instant at which the same packet is expected to be received. In a particular embodiment the known time intervals can be constant for all subsequent packets while in other embodiments the known time intervals may vary.

According to a further embodiment, the step of determining the peak to peak value according to the methods and their variations as above described may comprise calculating the difference between the actual time of arrival and the nominal time of arrival. In other words, according to this embodiment, the peak to peak value may be determined as the difference between the time instant at which the packet is actually received at the network entity and the time instant at which the same packet is expected to be received at the network entity. According to further embodiments, the mentioned difference between the actual time of arrival and the nominal time of arrival may be the absolute value of said difference.

According to a further embodiment, the methods and their variations above described may further comprise updating the nominal time of arrival when it is determined that the actual time of arrival of a received packet is smaller than the nominal time of arrival of the same packet. When this condition is verified, the nominal time of arrival is updated on the basis of the actual time of arrival of the same packet. In other words, in those embodiments wherein the jitter is represented by the actual time of arrival of packets received at the network entity, the nominal time of arrival representing the minimum expected time of arrival of packets is updated to the time at which a packet is actually received whenever the actual time of receipt of a packet is earlier than the expected minimum time of receipt of the same packet.

According to a further embodiment, the upper threshold discussed above may comprise a scheduled play-out time for a given data packet. The scheduled play-out time represents the time instant at which the packet is transmitted or forwarded by the network entity, i.e. the time instant at which the packet is played out by the network entity towards another network entity in the network 40 represented in FIG. 4. The upper threshold may further be determined on the basis of an appropriate correction factor or appropriate margin in order to take into account inaccuracies in the measurements or in order to avoid hysteresis. Furthermore, according to this embodiment, the step of detecting an out of range condition may optionally comprise verifying that the actual time of arrival of the given packet is larger than this upper threshold. In other words, according to this embodiment, an out of range condition may be detected when the actual time of arrival of a packet exceeds the time instant at which the same packet was scheduled to be forwarded to another network entity.

According to a further embodiment, the lower threshold above discussed may be determined as the difference between the scheduled play-out time for a given packet and the jitter protection time. According to this embodiment, the step of detecting an out of range condition may optionally comprise verifying that the actual time of arrival of this given packet is smaller than this lower threshold. In other words, an undershoot representing a particular case of an out of range condition may be detected when a packet is received at an actual time which is smaller than the scheduled play-out time decreased by the jitter protection time. This particular embodiment will be described in more detail later with reference for instance to FIGS. 11 and 13.

As also discussed above, the arrival time jitter values may be based on the actual time of arrival of the packets received at a network entity. Such solution is preferred when the network entity does not have a general time reference or a time reference shared also with other network entities. However the invention is not limited thereto. In fact, in those situations wherein a network entity shares the same clock reference with other network entities or wherein adequate signaling is in place in order to allow the network entity to know also the time instance at which packets are expected to be received, it is possible to have arrival time jitter values comprising the difference between an expected time of arrival at the network entity and the actual time at the network entity. In those situations, the arrival time jitter values would correspond to an effective delay of a data packet received at the network entity.

According to a further embodiment, the out of range condition discussed above may be detected according to a specific implementation when at least one arrival jitter value is larger than a second upper threshold and all arrival time jitter values are larger than a second lower threshold. In further particular embodiments the second upper threshold may correspond to the upper threshold above discussed or/and the second lower threshold may correspond to the previously discussed lower threshold. The advantage of this implementation is that statistical uncertainties may be further filtered out thus improving the accuracy of detection of out of range conditions. In fact, such a condition would filter out noises causing both overshoots and undershoots and focus only on out of range conditions presenting overshoots and potentially an increase of the delay when this is verified by the condition that the peak to peak value is smaller than the jitter protection time.

According to a further embodiment, the out of range condition may be detected when at least one arrival jitter value is smaller than a third lower threshold and all arrival time jitter values are lower than a third upper threshold. The third lower threshold can be in further embodiments correspond to or be set equal to the lower threshold or second lower threshold as above discussed. Similarly, the third upper threshold can correspond to or be coincident with the above discussed upper threshold or second upper threshold. The advantage of these further embodiments is that it is possible to filter out statistical uncertainties linked to cases generated by sporadic peaks in the delay (or in the time advance) causing both undershoots and overshoots. Thus, according to this embodiment, the detection can be focused on those cases presenting a decrease step introduced by resynchronization when confirmed by the comparison between the peak to peak value and the jitter protection time.

Figure 2:
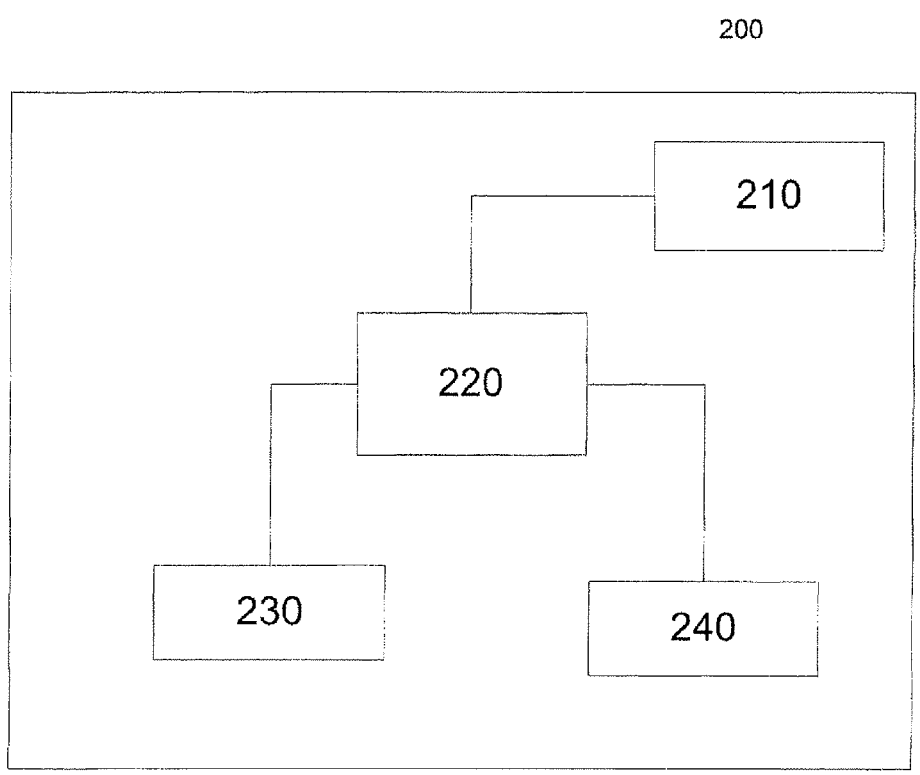
FIG. 2 illustrates a schematic block diagram of a network entity according to an embodiment of the present invention.

Reference will now be made to FIG. 2 showing a schematic block diagram of a network entity according to another embodiment of the present invention. The network entity 200 according to the present embodiment is adapted to detect occurrence of a transmission resynchronization of data packets subject to variable delays in a communication network. The general considerations or definitions, as for instance with reference to a network entity, resynchronization, play out time, jitter protection time etc. . . . , as made with reference to the method embodiments are also valid here. The network entity 200 according to the present embodiment comprises a transmitter 210 adapted to forward received packets after having delayed the same received packets of a jitter protection time. The data packets received by the transmitter are data packets received from other network entities, or other network nodes or other network devices as indicated by reference 10 in FIG. 4 or other network entities comprised in network 30 also indicated in FIG. 4.

The network entity 200 further comprises a processor 220 adapted to determine for a predetermined time period a set of arrival time jitter values comprising values corresponding to jitters of data packet arrival time for at least a plurality of the received data packets. The predetermined time period can be a given time window having a predetermined duration in time or may be linked to other conditions like for instance a talk spurt. Generally, for the predetermined time period the same considerations are valid as made above with reference to the method embodying the present invention. The processor 220 is further adapted to determine a peak to peak value indicating the largest difference among the values comprised in the determined set of arrival time jitter values. In other words, the processor determines arrival time jitter values representing the variation of the arrival time of packets received at the network entity and determines the largest difference among the determined arrival time jitter values in order to determine a peak to peak value. According to an optional embodiment, the largest difference may be calculated as the absolute value of the difference between the values comprised in the determined set of arrival time jitter values. According to another embodiment, the differences may be calculated between absolute values.

The network entity 200 further comprises a detector 230 configured to detect an out of range condition when it is verified that at least one arrival time jitter value is larger than a predetermined upper threshold or at least one arrival time jitter value is smaller than a predetermined lower threshold. The "or" operation implemented in the detector may indicate that one or both of the mentioned situation is verified. According to another embodiment, the "or" operation is implemented as an exclusive or operation. The out of range condition represents, therefore, a condition in which the jitter value is outside a specified interval represented by the upper and lower thresholds.

The network entity 200 further comprises a comparator 240 adapted to perform a comparison between the peak to peak value and the jitter protection time when the out of range condition is detected. In other words, when the detector reports that an out of range condition is detected, the comparator performs a comparison between the peak to peak value and the jitter protection time. The out of range condition may be reported by the detector 230 to the comparator 240 through the processor 220, directly to the processor, as indicated in FIG. 2, or directly to the comparator 240 in an alternative configuration not illustrated in the drawing.

Furthermore, the processor 220 according to the present embodiment is further adapted to detect that a resynchronization occurred on the basis of the comparison. In other words, the processor 220 is adapted to detect that a resynchronization occurred in the network according to the result output by the comparator when an out of range condition is detected by the detector 230.

In the above embodiment, the detector 230 reports the out of range condition to the processor 220. However, other implementations may be foreseen wherein the detector 230 reports the out of range condition to the comparator 240 which then combines this information with the result of the comparison and forwards the result to the processor. Different configurations are equally valid as long as the processor 220 is capable of detecting that a resynchronization occurred on the basis of the result of the comparator 240 and the result of the detector 230 reporting an out of range condition.

The network entity 200 according to the present embodiment is capable of detecting a resynchronization of a network with high accuracy. More in detail, the network entity 200 is capable of avoiding misdetections of resynchronizations that may be triggered by sporadic and occasional delay peaks due to high jitter. Therefore, the network entity 200 does not suffer from the typical problems of prior art solutions.

According to a further embodiment, the processor 220 of the network entity 200 may be further adapted to change the jitter protection time depending on the processor detecting that a resynchronization occurred. In other words, when the processor detects that a resynchronization occurred, the same processor may decide to change the jitter protection time. In one example, when it is detected that a resynchronization occurred and resulted in an average increase of the phase or the delay time of received packets, the processor may optionally be adapted to increase the jitter protection time in order to avoid further losses. Similarly, when the processor determines that a resynchronization occurred resulting in a reduction of the average delay of the packets received at the network entity, the processor may reduce the jitter protection time in order to reduce the total delay with which packets are forwarded by the network entity. The time instant at which packets are forwarded by the network entity 200 is represented, as already discussed above, by a reference time to which the jitter protection time is added to. In the above embodiment the processor is adapted to change the jitter protection time in order to adapt the play-out time to the resynchronization detected. However, according to other possible embodiments, the jitter protection time may be kept constant while the reference time may be adapted in order to respond to the resynchronization. For instance, when a resynchronization is detected resulting in an increase of the average delay of the received packets at the network entity, the reference time may be increased such that the resulting overall play-out time is increased in order to avoid late losses. Similarly, when a resynchronization is detected resulting in a decrease of the average delay of packets received at the network entity, the time reference may be reduced in order to reduce the play-out delay with which packets are forwarded by the network entity. The reference time can be for instance the time at which the first packet belonging to a sequence of packets is received at the network entity.

According to a further embodiment, the processor 220 of the network entity 200 may be optionally further adapted to change the jitter protection time of an amount corresponding to the average of the arrival time jitter values. In other words the processor 220 may be adapted to adjust the jitter protection time or, according to another embodiment, the reference time with which to determine the play-out time of packets by an amount which corresponds to the increase of or decrease of the average of the arrival time jitter values within the predetermined time period. With this respect, similar considerations herewith apply as made with reference to the method embodying the present invention.

According to a further embodiment, the network entity 200 and its components may be further adapted so as to be able to execute any of the methods embodying the inventions as described above or any of the embodiments described in the following as for instance with reference to FIGS. 5 to 13. The network entity 200 comprises the processor 220, the transmitter 210, the detector 230 and the comparator 240. However, it is to be understood that those components are merely illustrative. In fact, the same functions may be executed by one processor suitably programmed or by different means as long as they are adapted to perform the functions as performed by components 210 to 240 or by suitable means adapted to perform any of the methods embodying the present invention.

According to a further embodiment of the present invention, the methods above described and their variations may also be executed by a computer program product which comprises program parts arranged for conducting the mentioned methods when executed on a programmable processor.

Figure 3:
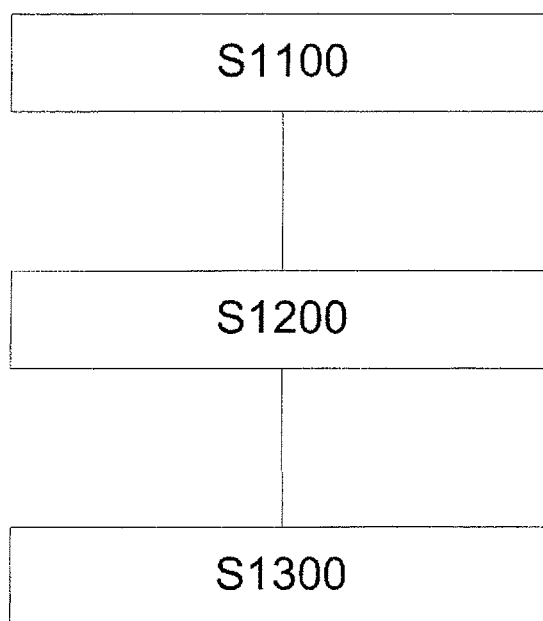
FIG. 3 illustrates a schematic flow chart showing the steps of a method for adaptively varying the play-out time of data packets subject to variable delays according to a further embodiment of the present invention.

Reference will now be made to FIG. 3 illustrating a schematic flow chart of a method for adaptively varying the play-out time of data packets subject to variable delays during transmission in a communication network. The play-out time represents the time instant at which a data packet is forwarded by a network entity like the network entity 20 of FIG. 4 to another network entity comprised for instance in the network 40 depicted in FIG. 4. According to the present embodiment, the data packets received at a network entity are forwarded by the same network entity at a current play-out time obtained by delaying the data packets of a given jitter protection time. In other words, data packets are received at a network entity and therein they are forwarded at a given time instant herein referred to as current play-out time. In other words, the current play-out time represents the time instant at which a packet is currently forwarded to the network. The current play-out time for a given packet is obtained by delaying the data packet of a given jitter protection time. In other words, a jitter protection time is added to a reference time or to a given time before forwarding the packet. The method according to the present embodiment comprises a step S1100 of determining during a given time period a nominal time of arrival corresponding to the smallest expected time of arrival of packets received during the given time period. It is noted that the given time period is a time period having a known or determinable length. According to an embodiment, the given time period may have a fixed duration in time. According to other embodiments, the given time period may be represented by a talk spurt as for instance when the DTX transmission is activated. Step S1100 determines the nominal time of arrival which represents the smallest time at which packets are expected to arrive at the network entity within this given time period. In an embodiment wherein the network entity does not have a clock reference synchronized with other network entities or wherein no specific signaling is in place for allowing the network entity to know the theoretical or expected time of arrival of a packet, the network entity may rely on an internal clock for measuring the time at which each packet is received. In such a situation, the nominal time may be represented by the time of arrival of the first packet or by, according to another embodiment, the time of arrival of a representative packet chosen among a given set of packets. Assuming that the following packets are separated by known intervals, the nominal time of arrival for following packets is obtained by incrementing the nominal time by the known time interval. When the following packet arrives earlier than the expected time of arrival, the nominal time of arrival is updated with the actual time of arrival of the packet. In other words, the nominal time of arrival is updated such that it represents the smallest expected time at which packets are expected to arrive at the network entity.

The method according to the present embodiment further comprises a step S1200 of determining whether a resynchronization occurred during transmission of the data packets. The method used for determining whether resynchronization occurred is irrelevant for the present embodiment. In fact, any method for detecting resynchronization is suitable for the present embodiment for adaptively varying the play-out time as long as this method is capable of indicating with a certain probability that a resynchronization occurred during transmission of data packets in the network.

In one specific embodiment, a method as depicted in FIG. 1 may be used for detecting resynchronizations. However, the embodiment of FIG. 3 is not restricted to this implementation.

In fact, also prior art methods of detecting resynchronization, for instance based only on the detection of overshoots or undershoots, or any other suitable method could be implemented at step S1200 as long as they provide an indication of a resynchronization.

The method according to the present embodiment then comprises a step S1300 of determining, if it is determined that a resynchronization occurred, a new play-out time at least on the basis of the current jitter protection time and the nominal time of arrival. In other words, when it is determined that a resynchronization occurred, regardless of the method used for determining the resynchronization, a new play-out time is calculated by taking into consideration the current jitter protection time and the nominal time of arrival.

In other words, upon occurrence of resynchronization, the play-out time is adaptively varied in consideration of the jitter protection time currently applicable and the nominal time of arrival representing the smallest expected time of arrival for packets, wherein this is the smallest expected time of arrival during the given time period.

An advantage achieved by the method of the present embodiment consists in that the play-out time can be flexibly varied according to the type of resynchronization, i.e. whether the resynchronization results in an increase or in a decrease of the delay or phase with which packets are forwarded, and in an amount which reflects the entity of the resynchronization, i.e. the play-out time is changed in a way proportioned to the amount of delay or phase change resulting from the resynchronization. In this case, over delayed play-out times can be avoided. Further, the play-out time can be shortened when a resynchronization allows for it.

According to a further embodiment of the method depicted in FIG. 3, the step of determining the new play-out time S1300 may optionally comprise adding the given jitter protection time to the determined nominal time of arrival when it is determined that the resynchronization occurred as a consequence of increased delay in the transmission. In other words, when it is determined that the resynchronization resulted in an increase of the delay retransmission or in an increase of the phase with which packets are to be forwarded by the network entity, then a new play-out time is calculated by adding the given jitter protection time to the determined nominal time of arrival representing the smallest expected time of arrival for the given time period.

In fact, if a resynchronization causes an increase of the phase with which packets are forwarded by the network entity during a given time period, the smallest expected time of arrival of packets is also increasing due to the resynchronization during the same time period. Based on this recognition and insight of the behavior of the system, it is possible to determine a play-out time by adding the jitter protection time to the nominal time of arrival calculated during the given time period.

According to another embodiment of the method depicted in FIG. 3, the step of determining S1300 the new play-out time may optionally comprise subtracting to the current play-out time the difference between a nominal time of arrival calculated in a preceding time period and the determined nominal time, when a resynchronization is detected resulting in a decrease of the average delay or in a decrease of the phase with which packets are forwarded by the network entity. The advantage of such a solution consists in that the general play-out delay can be decreased in an optimum measure according to the amount of reduction in delay or phase introduced by the resynchronization in the network.

According to a further embodiment of the method depicted in FIG. 3, packets are then transmitted by the network entity by delaying them of the new determined play-out time.

In the following, reference will be made to FIGS. 6 to 9 representing some illustrative situations to which the present invention can be applied to. The same figures will also be helpful in understanding the principle of the functioning of some embodiments of the present invention.

Figure 4:
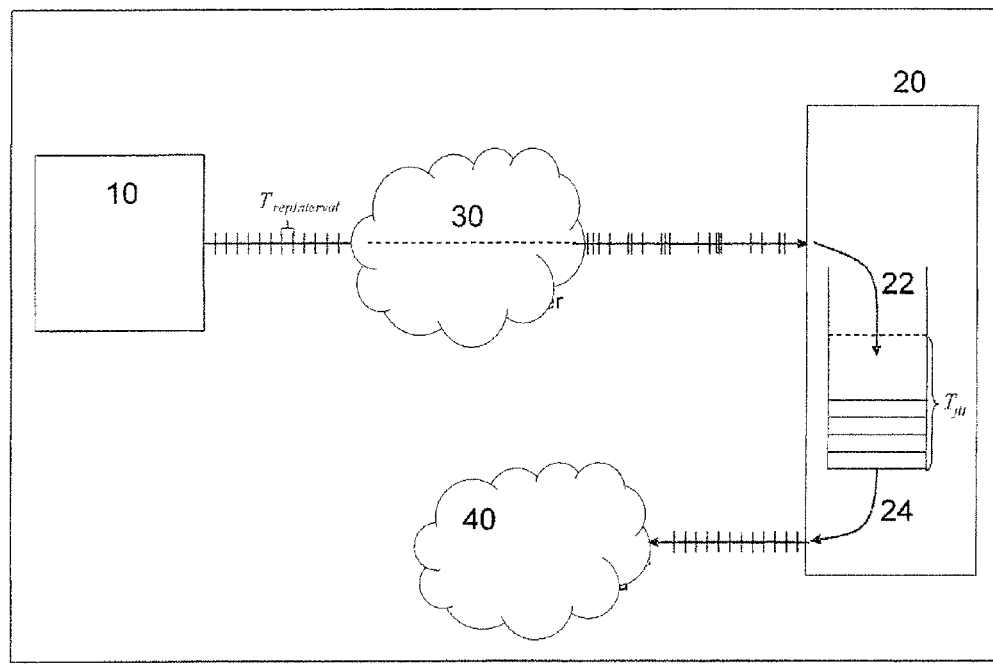
FIG. 4 illustrates a schematic functional diagram representing a communication network to which the present invention can be applied and the principle of jitter buffering.
Figure 5:
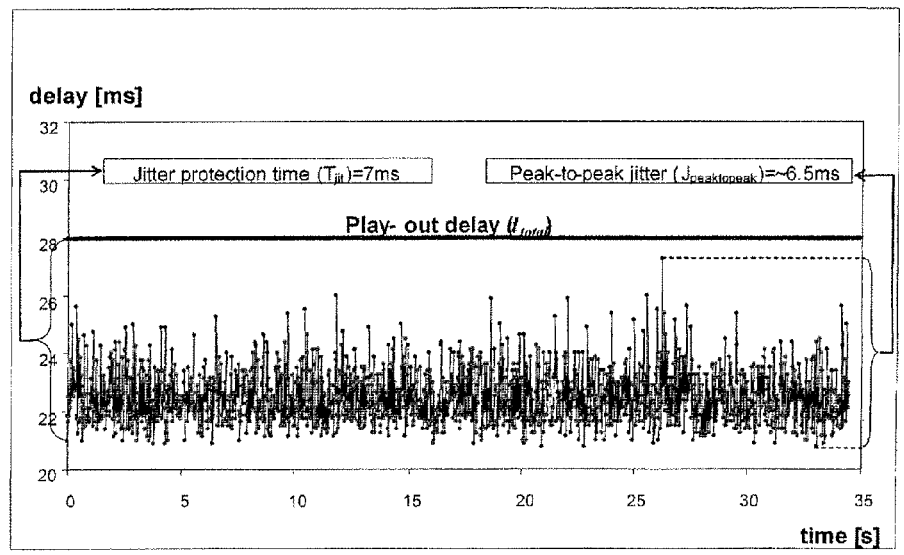
FIG. 5 shows an example for static jitter buffering with sufficient jitter protection time.

Those figures represent situations wherein the phase of delivery is changed for instance at a packet source 10 of FIG. 4. In the following discussion, it will be often presented the case of a regular time interval separating two successive packets. However, the invention would equally apply to other cases wherein the intervals separating two successive packets are not constant but however known or communicated to the network entity. If the packet source changes the phase of the delivery sequence by a certain time step after the jitter buffering in the receiving node has been synchronized (i.e. the synchronization source changes), then optimal play-out time sequence with respect to the new arrival time sequence is usually not aligned with the original play-out time sequence. This causes a misalignment delay, which is a constant offset in delay per instance k, but uniformly distributed random value over the set of instances in the range $0, \ldots, T_{repInterval}$. It may even cause a sudden increase of late losses in spite of that the actual transport jitter has not been increased. This is illustrated in FIG. 6, where the input delay profile of FIG. 5 has been disturbed by a delay step. It is noted that FIGS. 5 to 14 represent delays, thus implying that the actual and theoretical arrival times are known. It is however noted that those figures are only illustrative and do not restrict the invention to the case wherein the network entity knows those time references. It is further noted that, in fact, even when the network entity is only capable to measure only the actual time of arrival of packets, still the distribution of the delays are represented by FIGS. 5 to 14. In other words, in spite of that those figures show delays, the following embodiments or the equations that will be introduced with their respect are based on a running time measured for instance by a receiver's clock (not shown in the figures) at the network entity, so that no absolute delay values are needed and thus the skewing and drifting between receiver's and sender's clocks do not need to be compensated. The basic measurements are the arrival times (Tin,i) of the packets. Delays are used in figures and sometimes in explanations because they are more illustrative to the reader than arrival times. As mentioned, absolute (one-way) delays may be more difficult to measure by the receiver than the arrival times, especially in those situations wherein the receiver is not able to indicate the exact transmission time from the sender, which should be available in order to measure the absolute delays. However, as already mentioned, the present invention and following embodiments would equally apply to the case wherein the system or network entity/entities is/are capable of measuring or having knowledge of the absolute delays.

In the example depicted for instance in these figures the transmission sequence of speech packets with a regular packet interval of 20 ms is suddenly changed at the source so that the misalignment delay happens to be 3.5 ms. This looks like an upward step in the delay curve occurring at 10 s. The jitter buffering was synchronized at time 0 s with the original delay sequence as in FIG. 5. After the input delay step the packet is every now and then too late with respect to the play-out sequence $T_{out,i}$. This causes late losses with static jitter buffering, because over delayed packets are simply lost (i.e. dropped without playing-out). It is noted that the choice of the above and below numerical values are merely illustrative and not restrictive.

Another example is illustrated in FIG. 7. Here the misalignment delay happens to be 16.5 ms, but it looks on the receiver's side like a downward step in the delay curve occurring at 10 s. So effectively the misalignment delay is in the range of $-10, \ldots, 10$ ms with 20 ms packet interval. The consequence of this is an increased jitter buffer margin, which is perceived as increased play-out delay.

There are several causes for such changes of the phase of the delivery sequence on the sending side, for instance a handover, resynchronization caused by a service change, etc. An example of a service change related to telephony services is the following case: at first a "ringing tone" packets are transmitted towards the caller (A-subscriber) by some network node (like media gateway) with a certain packet sequence, then B-subscriber answers and "ringing tone" sequence is replaced by a speech sequence originating from B's phone with the same interval but different phase of the transmission sequence.

A way to prevent late losses in the case of FIG. 6 is to replace the static jitter buffering by a so called "semi static" one. It means that over delayed packets are not lost but postponed to the next (or subsequent) play-out time $T_{out,i+1}$. In this case the total delay $d_{total}$ jumps up by an extra delay of the repetition interval ($T_{repInterval}$) like illustrated in FIG. 8.

When the jitter buffer is empty for the first time after the input delay step, the play-out is postponed by $T_{repInterval}$. Because $T_{repInterval}$ is often bigger than the input delay step, it increases the jitter protection margin more than necessary. In the example of the FIG. 5 $T_{repInterval}$=20 ms, which is 16.5 ms bigger than the input delay step of 3.5 ms.

Figure 9:
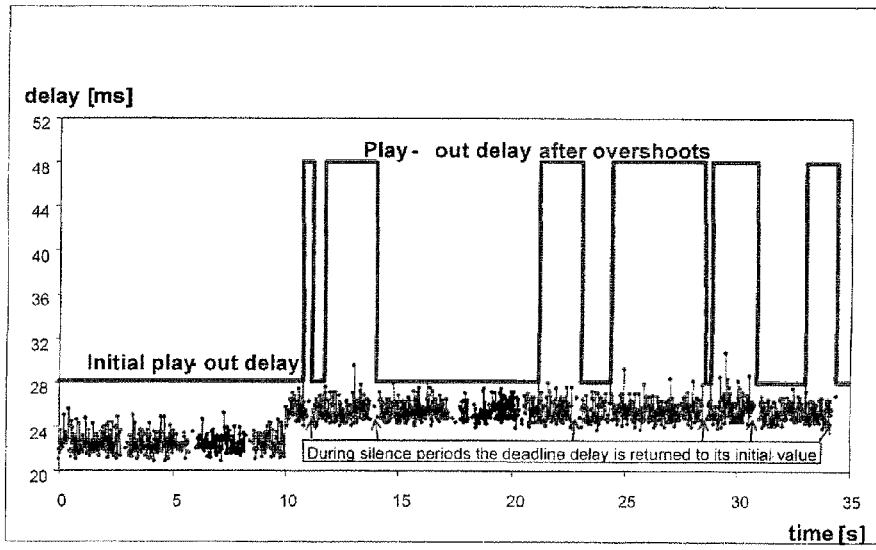
FIG. 9 illustrates an example wherein a jitter protection margin jumps repeatedly when DTX is enabled.

Another "feature" of a "semi static" jitter buffering is, that if there are pauses in the regular packet stream, the jumped total delay $d_{total}$ resumes its original level after the pause, because there is usually a so called "catch-up" procedure during pauses to decrease the temporarily increased delay because of "overshoots" due to real jitter peaks. An example of such a pause in telephony services is a silence period in a speech packet flow, when discontinuous transmission (DTX) is enabled. During the silence period the input packet rate is lower than during the talk spurt and the jitter buffer gets empty and "catch-up" will be made. When the next talk spurt starts the play out starts with the original play-out sequence $T_{out,i}$ and the jitter protection drops to its initial value again. This behavior combined with the input delay step is illustrated in the example of FIG. 9.

The total delay $d_{total}$ jumps up by $T_{repInterval}$ (=20 ms in this case) every time a delay "overshoot" happens after the input delay step. It stays up until the next silence period, during which it comes down again (or to its original value) because of "catch-up". During the next talk spurt it may jump up again, because delay "overshoot" is possible again. So after the input delay step an "overshoot" may happen (at most) once per each talk spurt. Consequently the total delay may jump up and down by $T_{repInterval}$ intermittently during talk spurts and silence periods respectively, which is suboptimal behavior for the speech quality.

Also this "semi-static" jitter buffer does not help in the case of an increased jitter buffer margin shown in FIG. 7.

According to another possible solution, the sender may request the receiver to resynchronize its jitter buffering in order to have a new optimized play-out timing sequence $T_{out,i}$, when the sender detects that a step happens in the delivering sequence. This however requires some (in-/outband) control signaling protocol like for instance Synchronization source (SSRC) in the header field of an RTP-packet (according to IETF RFC 3550). Unfortunately this is not always available or used for this purpose.

Figure 10:
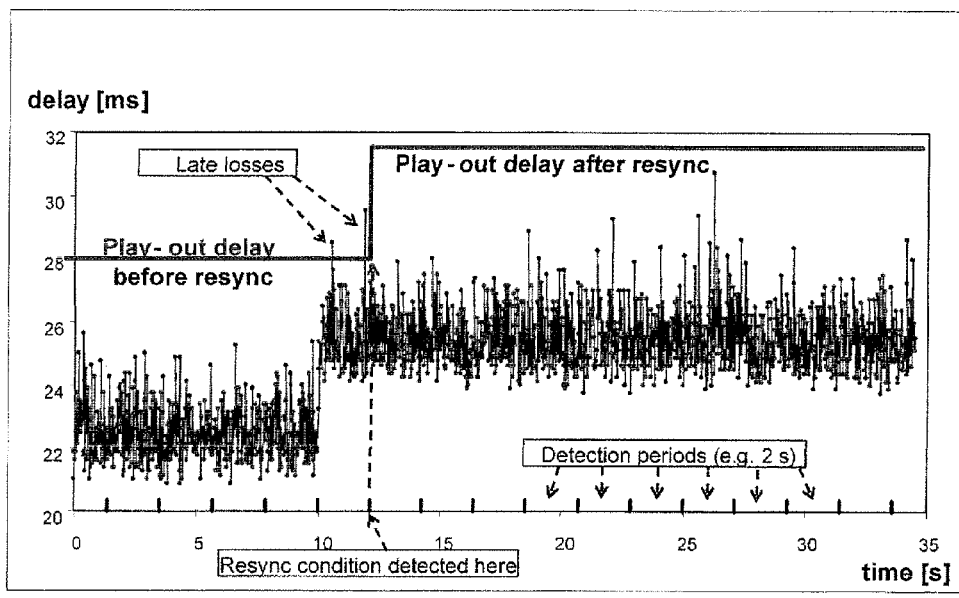
FIG. 10 illustrates an example of a deadline delay changed by resynchronization (upward step)
Figure 11:
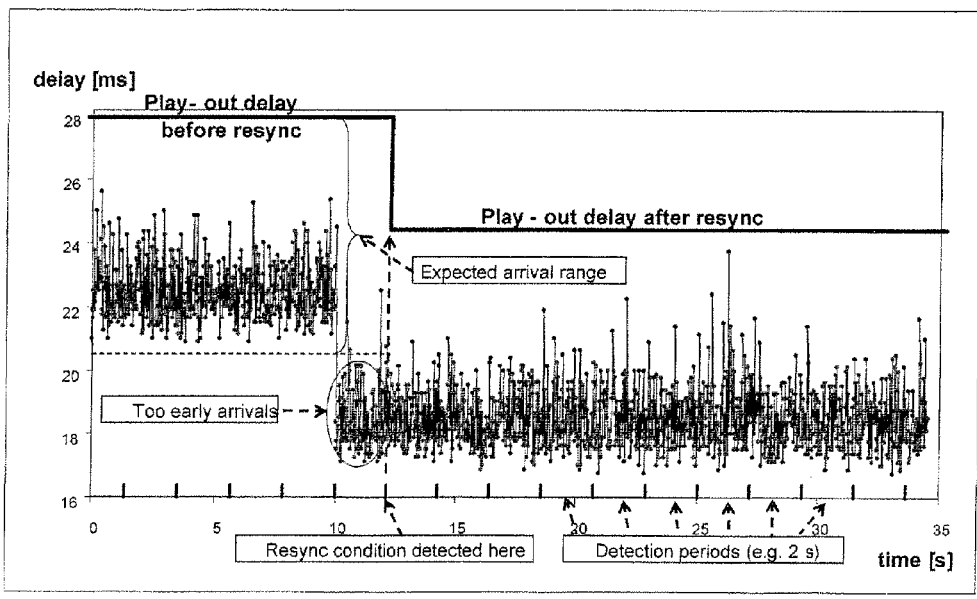
FIG. 11 illustrates an example of a deadline delay changed by resynchronization (downward step)

In the following, it will be explained how an embodiment of the present invention can be applied to the above situations in order to obtain the mentioned advantages. According to this embodiment, it is possible to detect an input delay step hidden by noise due to jitter. It is based on analyzing the behavior of the arrival times of the packets on the receiving side. This is illustrated in FIGS. 10 and 11 for up- and downward delay steps respectively.

The behavior of the arrival times are analyzed over detection periods of a certain duration (like e.g. 2 s). Another way of defining detection periods is to align them with talk spurts in telephony services, if DTX is enabled and the talk spurt has been long enough so that analysis is based on reliable amount of consecutive packets. Or a combination of both ways could be used, i.e. a detection period is a talk spurt or some constant timeout whichever expires first.

At the end of the detection period the number of late packets (or "overshoots") or the number of too early arrivals (or "undershoots") as well as the local peak-to-peak jitter $J_{peaktopeak}$ within the previous detection period are measured. These measurements are used to detect, if an input delay step has happened. The number of overshoots and undershoots correspond to and are an example of the detection of an out of range condition according to the embodiment depicted in FIG. 1. If at the end of a detection period "overshoots" or "undershoots" have been detected but $J_{peaktopeak}$ is significantly smaller than the jitter protection time $T_{jit}$, then input delay step is indicated and the jitter buffering is resynchronized (like shown at ~12 s). This is an example of the step S150 of detecting that a resynchronization occurred on the basis of the undershoot or overshoot, i.e. the out of range condition, and the peak to peak value calculated at step S140 according to the embodiment of FIG. 1. This resynchronization causes the play-out sequence to be delayed (in the example of FIG. 10) or advanced (in the example of FIG. 11) by the size of the input delay step (3.5 ms or −3.5 ms in these examples). Those are examples of the step of changing the play out time that can be achieved either by changing the jitter protection time or the reference time as above illustrated.

Figure 12:
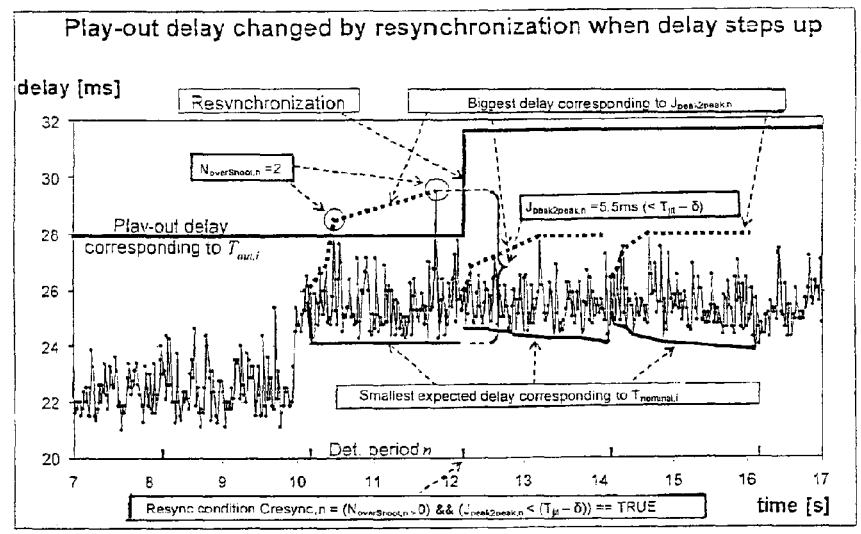
FIG. 12 illustrates an example of a play-out delay changed by resynchronization when delay steps up.
Figure 13:
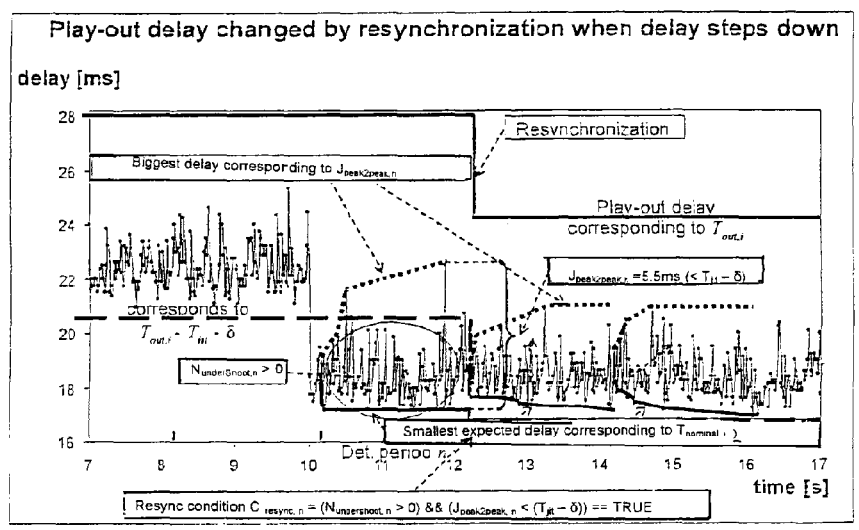
FIG. 13 illustrates an example of a play-out delay changed by resynchronization when delay steps down.

A more detailed description of an embodiment of the present invention is based by taking a closer look to the places where the input delay step is detected. This is illustrated in FIGS. 12 and 13 for up- and downward delay steps respectively.

The number of overshoots ($N_{overShoot,n}$) during a certain detection period (n) is measured by the following method executed for every received packet (i):

if $(T_{in,i} > T_{out,i}) N_{overShoot,n} = N_{overShoot,n} + 1$ where $T_{in,i}$ is the arrival time of the packet i and $T_{out,i}$ is the scheduled play-out time of packet i. This is an example of the step S130 determining an out of range condition according to the embodiments depicted in FIG. 1.

The number of undershoots ($N_{underShoot,n}$) during a certain detection period (n) is measured by the following method executed for every received packet (i):

if $(T_{in,i} < T_{out,i} - T_{jit} - \delta) = N_{underShoot,n} = N_{underShoot,n} + 1$ where $T_{jit}$ is the jitter protection time and $\delta$=some small margin (e.g. 0.5 ms). This is another example of the step S130 determining an out of range condition according to the embodiments depicted in FIG. 1.

The local peak-to-peak jitter ($J_{peaktopeak,n}$) during a certain detection period (n) is measured by the following method executed also for every packet (i):

if $(T_{in,i} < T_{nominal,i}) T_{nominal,i} = T_{in,i}$ if $((T_{in,i} - T_{nominal,i}) > J_{peaktopeak,n}) J_{peaktopeak,n} = T_{in,i} - T_{nominal,i}$ $T_{nominal,i} = T_{nominal,i} + T_{repInterval}$ where $T_{repInterval}$ is equal to the value of the regular packet interval at the source (known by default and based on the use case) and $T_{nominal,i}$ is equal to the current value of the smallest expected arrival time for the packet i. FIGS. 12 and 13 illustrate also the traces corresponding to the so far smallest expected delay and the so far biggest detected delay, based on which $J_{peaktopeak,n}$ is determined. The above formulas are examples of determining the nominal time of arrival and updating it according to modifications of the embodiment depicted in FIG. 1 as above illustrated.

At the beginning of each detection period n the following re-initializations are made:
$N_{overshoot,n} = 0$
$N_{undershoot,n} = 0$
$J_{peaktopeak,n} = 0$
$T_{nominal,i} = T_{in,i}$ At the end of each detection period the resynchronization condition is evaluated. It is defined by the following Boolean variable. If it is TRUE, then the assumption is, that an input delay step has been detected during the last detection period n.

$C_{reSync,n} = ((N_{overShoot,n} > 0) || (N_{underShoot,n} > 0)) \&\& (J_{peak2peak,n} < (T_{jit} - \delta))$ where $T_{jit}$=the jitter protection time and $\delta$=some small margin (e.g. 0.5 ms). This represents an example of the step S150, according to the embodiment of FIG. 1, of determining whether a resynchronization occurred on the basis of the out of range conditions, e.g. the number of overshoots or undershoots, and the peak to peak value determined at step S140.

When $C_{resync,n}$ is TRUE the jitter buffering at the receiving side is resynchronized. The resynchronization at the end of a detection period shall be based on the value of $T_{nominal,i}$ at the end of the detection period (before it is re-initialized) instead of the single value of $T_{in,i}$. This way the resynchronization corresponds as close to the minimum transport delay $d_{min}$ as possible, and the total delay ($d_{total}$) is as close to the minimum value of $d_{min} T_{jit}$ as possible. This is an example of changing the play out time by changing the reference time as explained in one of the above embodiments.

FIG. 14 illustrates a case where an "overshoot" happens because of an over delayed packet due to a real jitter peak and not due to a misalignment delay step caused by the sender.

Here the resynchronization condition $C_{resync,n}$ is FALSE and resynchronization of the jitter buffering does not help and it is not made, because $J_{peak2peak,n} \geq (T_{jit} - \delta)$ Therefore, it is evident how the present embodiment is capable of accurately and reliably detect whether a resynchronization occurred by taking into account the peak to peak value and an out of range condition. The example illustrated in FIG. 14 also shows how the invention applied to the present embodiment is immune to false detections that may otherwise be caused by the occurrence of delay peaks caused by occasional and sporadic high jitter.

A further embodiment for an enhanced resynchronization condition, that filters out the statistical uncertainties and makes the decision more secure, is given below $$C_{resync,n} = (((N_{overshoot,n} > 0) \&\& (N_{undershoot,n} = 0)) \| ((N_{undershoot,n} > 0) \&\& (N_{overshoot,n} = 0))) \&\& (J_{peaktopeak,n} < (T_{jit} - \delta))$$

According to this further embodiment, an even higher accuracy may be achieved in detecting resynchronizations in the network.

As evident from the above description and several embodiments, the present invention allows several advantages as above discussed.

A further advantage consists in that is possible to detect up- or downward delay steps caused by misalignment delay due to changed synchronization source at the sender's side and thus sub-optimal jitter buffering margin is prevented, because resynchronization of the receiver's jitter buffering can be requested. Detection works also when the delay step is hidden by noise due to jitter.

A further advantage consists in that the invention allows re-synchronization of the destination without explicit in- or out-band control signalling, when the synchronization source has been changed on the sending side.

A further advantage consists in that the invention allows discriminating buffer underflows because of input delay steps from underflows because of too high real jitter peaks. Thus, the late loss probability is kept low with static jitter buffering by letting the receiving end to resynchronize the play-out sequence, when an input delay step has happened.

With a so called "semi-static" jitter buffering, as discussed above and which may be implemented in a network entity like media gateway (MGW), this invention further prevents the total delay from increasing more than necessary thus causing degradations in the interactive conversation quality.

It will be apparent to those skilled in the art that various modifications and variations can be made in the entities and methods of the invention as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and firmware will be suitable for practicing the present invention.

Where the terms like processor, detector, comparator, network entity are used herewith, no restriction is made regarding how distributed these elements may be and regarding how gathered elements may be. That is, the constituent parts of a unit or element or entity may be distributed in different software or hardware components or devices for bringing about the intended function. A plurality of distinct elements may also be gathered for providing the intended functionalities.

Any one of the above-referred units of a network entity, or an element, or a network device, or a network node, etc. . . . may be implemented in hardware, software, field-programmable gate array (FPGA), application-specific integrated circuit (ASICs), firmware or the like.

In further embodiments of the invention, any one of the above-mentioned and/or claimed parts like controller or receiver (this list being not exhaustive) may be replaced by corresponding controlling means or receiving means.

In further embodiments of the invention, any one of the above-described steps may be implemented using computer-readable instructions, for instance in the form of computer-understandable procedures, methods or the like, in any kind of computer languages, and/or in the form of embedded software on firmware, integrated circuits or the like.

Moreover, other implementations of the invention will be apparent to those skilled in the art from consideration of the specification and practice of the invention disclosed herein. It is intended that the specification and the examples be considered as exemplary only. To this end, it is to be understood that inventive aspects lie in less than all features of a single foregoing disclosed implementation or configuration. Thus, the true scope and spirit of the invention is indicated by the following claims.

The invention claimed is:

1. A method for detecting occurrence of a transmission resynchronization of data packets subject to variable delays in a communications network, the packets received at a network entity and forwarded by the network entity are delayed by a jitter protection time, the network entity comprising a processor and the method comprising performing at the network entity the steps of:
   determining for a predetermined time period by the network entity a set of arrival time jitter values comprising values corresponding to jitters of data packet arrival time for at least a plurality of the received data packets;
   determining a peak to peak value by the network entity indicating a largest difference among the values comprised in the determined set of arrival time jitter values;
   detecting by the network entity an out of range condition when it is verified that at least one arrival time jitter value is larger than an upper threshold or at least one arrival time jitter value is smaller than a lower threshold;
   comparing by the network entity the peak to peak value with the jitter protection time, when the out of range condition is detected; and
   detecting by the network entity that a resynchronization occurred on the basis of the comparison of the peak to peak value with the jitter protection time.

2. The method according to claim 1, further comprising changing the jitter protection time depending on detecting that the resynchronization occurred on the basis of the peak to peak value with the jitter protection time.

3. The method according to claim 2, wherein changing the jitter protection time further comprises changing the jitter protection time by an amount corresponding to an average of the arrival time jitter values.

4. The method according to claim 1, wherein the arrival time jitter values comprise actual times of arrival of received data packets at the network entity.

5. The method according to claim 1, further comprising determining a nominal time of arrival for a received packet that represents a current smallest expected time of arrival for said received packet.

6. The method according to claim 5, wherein determining the peak to peak value comprises determining a difference between an actual time of arrival of a given packet and the nominal time of arrival for said packet.

7. The method according to claim 5, wherein the nominal time of arrival is updated on the basis of the actual time of arrival of said packet when the actual time of arrival of a received packet is smaller than the nominal time of arrival.

8. The method according to claim 4, wherein the upper threshold comprises a scheduled play out time for a given data packet and detecting the out of range condition comprises verifying that the actual time of arrival of said given packet is larger than said upper threshold.

9. The method according to claim 4, wherein the lower threshold is determined as a difference between a scheduled play out time for a given packet and the jitter protection time and detecting the out of range condition comprises verifying that an actual time of arrival of said given packet is smaller than said lower threshold.

10. The method according to claim 1, wherein the arrival time jitter values comprise a difference between an expected time of arrival at the network entity and an actual arrival time at the network entity.

11. The method according to claim 1, wherein the out of range condition is detected when at least one arrival jitter value is larger than a second upper threshold and all arrival time jitter values are larger than a second lower threshold.

12. The method according to claim 1, wherein the out of range condition is detected when at least one arrival jitter value is smaller than a third lower threshold and all arrival time jitter values are lower than a third upper threshold.

13. The method according to claim 1, further comprising forwarding packets at the network entity by adding the jitter protection time to a reference time and changing the reference time depending on detecting that the resynchronization occurred on the basis of the peak to peak value with the jitter protection time.

14. A network entity for detecting an occurrence of a transmission resynchronization of data packets subject to variable delays in a communication network, the network entity comprising:
  a transmitter adapted to forward received data packets after having delayed said received packets by a jitter protection time;
  a processor adapted to determine for a predetermined time period a set of arrival time jitter values comprising values corresponding to jitters of data packet arrival time for at least a plurality of the received data packets, the processor further adapted to determine a peak to peak value indicating a largest difference among the values comprised in the determined set of arrival time jitter values;
  a detector configured to detect an out of range condition when it is verified that at least one arrival time jitter value is larger than a predetermined upper threshold or at least one arrival time jitter value is smaller than a predetermined lower threshold;
  a comparator adapted to perform a comparison between the peak to peak value and the jitter protection time when the out of range condition is detected;
  wherein the processor is further adapted to detect that a resynchronization occurred on the basis of the comparison between the peak to peak value and the jitter protection time.

15. The network entity according to claim 14, wherein the processor is further adapted to change the jitter protection time depending on the processor detecting that the resynchronization occurred.

16. The network entity according to claim 15, wherein the processor is further adapted to change the jitter protection time by an amount corresponding to an average of the arrival time jitter values.

17. A computer program product stored in a non-transitory computer readable medium and comprises computer-executable process steps for detecting an occurrence of a transmission resynchronization of data packets subject to variable delays in a communications network, the packets received at a network entity and forwarded by the network entity are delayed by a jitter protection time, the computer-executable process steps when executed by a processor of the network entity cause the network entity to perform the steps of:
  determining for a predetermined time period a set of arrival time jitter values comprising values corresponding to jitters of data packet arrival time for at least a plurality of the received data packets;
  determining a peak to peak value indicating a largest difference among the values comprised in the determined set of arrival time jitter values;
  detecting an out of range condition when it is verified that at least one arrival time jitter value is larger than an upper threshold or at least one arrival time jitter value is smaller than a lower threshold;
  comparing the peak to peak value with the jitter protection time, when the out of range condition is detected; and
  detecting that a resynchronization occurred on the basis of the comparison of the peak to peak value with the jitter protection time.

* * * * *